United States Patent
Blake, III

Patent Number: 6,129,186
Date of Patent: Oct. 10, 2000

[54] ROTATIONAL DAMPER

[75] Inventor: Thomas E. Blake, III, South Lyon, Mich.

[73] Assignee: TRW Inc., Cleveland, Ohio

[21] Appl. No.: 09/054,581

[22] Filed: Apr. 3, 1998

[51] Int. Cl.$^7$ .................................................. F16F 11/00
[52] U.S. Cl. ...................................... 188/381; 188/322.5
[58] Field of Search ........................... 188/83, 130, 322.5, 188/381; 267/196, 201, 205, 207; 74/572, 573 F

[56] References Cited

U.S. PATENT DOCUMENTS

| | | | |
|---|---|---|---|
| 1,833,596 | 11/1931 | Sarri | 188/130 |
| 2,187,923 | 1/1940 | Winkleman | 188/130 |
| 2,354,448 | 7/1944 | Brown | 188/130 |
| 3,696,891 | 10/1972 | Poe | 188/130 |
| 5,183,137 | 2/1993 | Siwek et al. | 188/381 |
| 5,257,680 | 11/1993 | Corcoran et al. | 188/129 |
| 5,421,221 | 6/1995 | Warchocki | 74/573 |
| 5,497,863 | 3/1996 | Schmidt et al. | 188/306 |
| 5,542,508 | 8/1996 | Van Erden et al. | 188/290 |
| 5,605,208 | 2/1997 | Friedrichsen et al. | 188/130 |
| 5,865,278 | 2/1999 | Wagner | 188/130 |

*Primary Examiner*—Chris Schwartz
*Attorney, Agent, or Firm*—Fay, Sharpe, Fagan, Minnich & McKee, LLP

[57] ABSTRACT

A rotational dampening apparatus 10 includes a cup-shaped housing member 12 and, mounted for rotational movement in the cup-shaped housing member, a rotor member 14 and a dampening member 16, the dampening member being held compressed between the rotor member and the cup-shaped housing member. The cup-shaped housing member includes a substantially planar annular end wall 32 and a cylindrical side wall 34 extending from the end wall. The rotor member and the cylindrical side wall respectively define cooperating first and second circular connection areas 38, 36 for snap-lock connecting the rotor member 14 to the housing member 12. The first and second circular connecting area form a bearing surface upon which the rotor member rotates. A first dampening interface A is created between a set of ribs 60 disposed on the end wall of the housing member and the bottom face surface 52 of the dampening member. A second dampening interface B is created between a set of ribs 64 disposed on the bottom face surface of the rotor member and the top face surface 50 of dampening member. The damping forces generated by the first and second dampening interfaces are cumulative in effect.

20 Claims, 7 Drawing Sheets

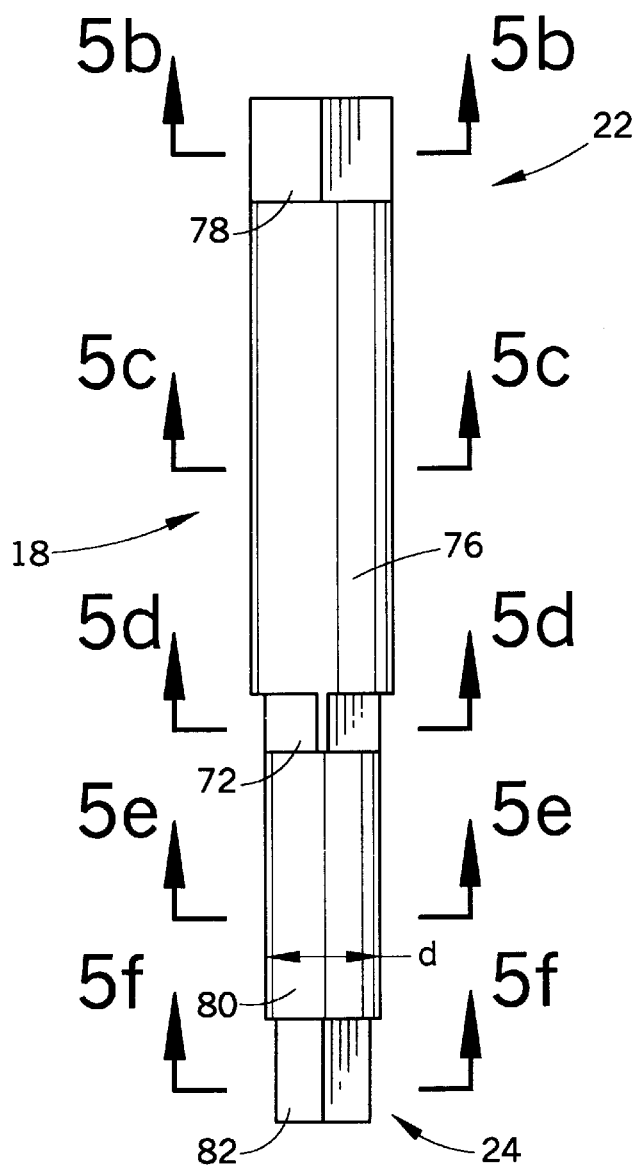
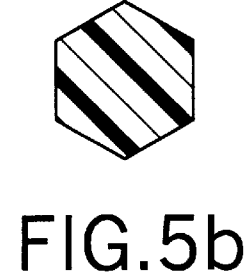
FIG.5b
FIG.5c
FIG.5a
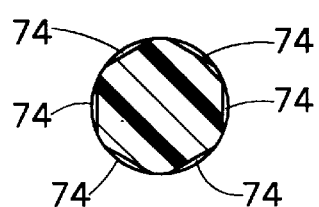
FIG.5d
FIG.5e
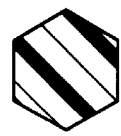
FIG.5f

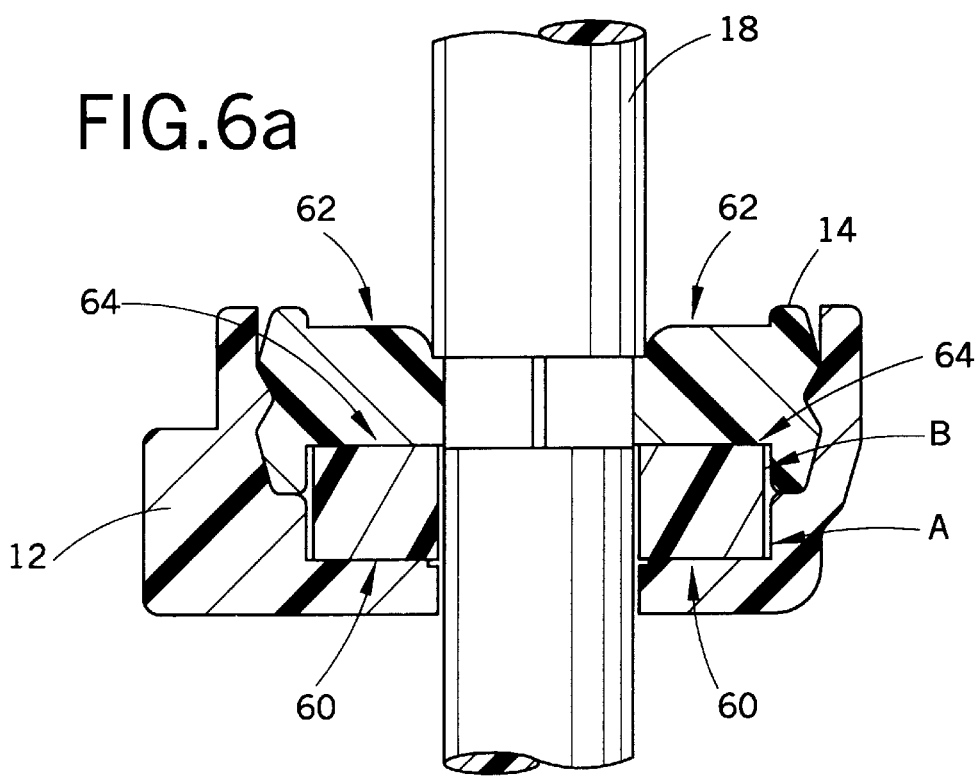
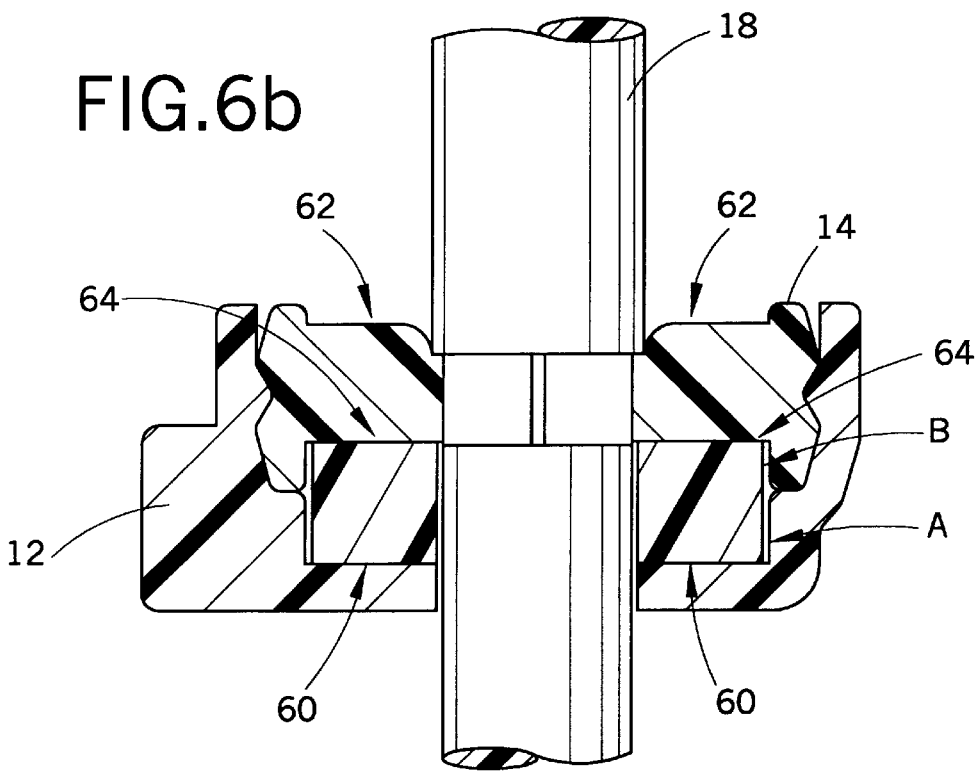

ROTATIONAL DAMPER

BACKGROUND OF THE INVENTION

The subject invention is directed to the mechanical dampener art and, more particularly, to a rotational damper for use in motor vehicle applications to enable the smooth motion of spring-loaded accessory components and will be described with particular reference thereto. However, it is to be understood that the invention has broader application and is useful as an interface to reduce jerky motion and vibrations or oscillations between any pair of mechanical parts that are rotated with respect to each other.

Viscous dampers have, in the past, been widely used to reduce oscillations and vibrations between moving parts. In those devices, a set of vanes on a turning rotor act against a fluid dampening medium to generate a counter moment or resistance which is used for dampening purposes. Fluids having a relatively high viscosity such as, for example, silicone oil are often used as the dampening medium because of their relatively stable nature and good performance characteristics. Viscous damping devices of this type are commercially readily available and widely used.

One problem, however, with dampers based on flowable mediums, is that they are difficult to manufacture, relatively expensive, and oftentimes sensitive to variations in temperature. In order to prevent the dampening fluid from leaking from the device housing, various seals or the like must be incorporated into the dampener design, adding to its complexity and overall increased cost. It is difficult to manufacture such dampers because the tolerances between the seals and sealing surfaces must be precisely controlled. Further, it is difficult to control the dependency of the fluid medium viscosity on the temperature of the device particularly as the device heats up during use.

As an alternative, various rotational dampers have been proposed which are purely mechanical in nature. One such device is taught in U.S. Pat. No. 5,605,208 wherein a disk-shaped rotor is supported within a housing together with an annular friction surface, the rotor being axially pressed by a spring member against the friction surface within the housing to establish a dampening interface therebetween. According to this construction, the braking moment between the rotor and the friction surface is primarily established by the force of the spring member acting against the rotor. The counter force may therefore be varied by controlling the tension on the spring member or, alternatively, through selection of alternative materials having various coefficients of friction for use as the frictional material.

One problem with the above design, however, is that the spring member adds to the overall cost of the device and, in addition, makes manufacture thereof more difficult because the spring must be precisely positioned within the device. In addition, the device is sensitive to the spring constant, or spring force, of the biasing spring which may lead to loss of dampening effect as the spring ages during use.

Further with regard to the above device, only a single side surface of the frictional material is used to provide a dampening interface between the movable rotor member and the fixed housing member. The second side surface of the frictional material is used to secure the frictional material to the housing member and, thus, is wasted with respect to its potential use as a second dampening interface between the frictional material and the housing member for providing an additional second dampening effect.

SUMMARY OF THE INVENTION

The subject invention overcomes the above-noted drawbacks and disadvantages of the prior art rotational dampers. Devices formed in accordance with the invention comprise a very limited number of parts and, therefore, can be quickly and easily assembled together without the need for extremely precise manufacturing techniques. The minimum part count makes the present invention inexpensive.

In accordance with the subject invention, there is provided a rotational dampening assembly for generating dampening forces between the relative movement of a rotor member and a housing member. The housing member is generally cup-shaped in construction and includes a substantially planar annular end wall defining a first surface and a cylindrical side wall extending from the first surface of the annular end wall. The dampening member is disk-shaped and contained within the cylindrical side wall of the cup-shaped housing member together with the rotor member. The dampening member is compressed between a first surface of the rotor member and the first surface of the substantially planar annular end wall for generating frictional dampening forces between the rotor member and the housing member as the rotor member rotates relative to the housing member. A first dampening interface is formed at the engagement area between the dampening member and the end wall of the housing member. A second dampening interface is formed between the dampening member and the rotor member to provide a second dampening effect. The effects of the first and second damping forces are cumulative.

Preferably, the cylindrical side wall and the rotor member respectively define cooperating first and second circular connecting areas. The rotor member and the housing member are disposed in a snap-fit engaged relationship at the cooperating first and second circular connecting areas in a manner to compress the dampening member between the first surface of the rotor member and the first surface of the annular end wall.

In accordance with a more limited aspect of the invention, the cooperating first and second circular connecting areas form a bearing surface between the rotor member and the cylindrical side wall to hold the rotor member in a rotatable engaged relationship within the cup-shaped housing member against a biasing force of the dampening member compressed between the rotor member and the first surface of the end wall.

So that the rotor member and the housing member are connectable to operatively associated external movable members to provide dampening therebetween, the rotor member forms a first aperture substantially centered on an axial central longitudinal axis thereof. The aperture defines a first attachment area adapting the rotor member for connection to a first operatively associated external member movable relative to the housing member. In a similar fashion, the housing member defines a second attachment area adapting the housing member for connection to the second operatively associated external member movable relative to the rotor member.

In accordance with a more limited aspect, the rotary damper of the present invention is adapted to accept an elongate driven member extending through a central longitudinal aperture formed in the damper. Preferably, the first aperture formed in the rotor member extends completely therethrough. The annular end wall of the housing member forms a second aperture substantially spaced apart from the first aperture and located on the central longitudinal axis defined by the cylindrical side wall of the housing member. The second aperture adapts the cup-shaped housing member to loosely rotatably receive the first operatively associated external member therethrough along the central longitudinal axis. A third aperture substantially centered on the central longitudinal axis is formed in the disk-shaped compressible member. The third aperture adapts the disk-shaped compressible member to loosely rotatably receive the first operatively associated external member therethrough along the central longitudinal axis. In that manner, the rotary damper of the subject invention is adapted to receive a first operatively associated external member extending therethrough and connected to the rotor member and, further, to engage a second operatively associated external member with the cup-shaped housing member to provide relative rotary dampening between the first and second external members.

In accordance with yet a more limited aspect of the invention, a pair of dampening interfaces are provided between the rotor member and the cup-shaped housing member. Preferably, the first surface of the annular end wall and a first side of the dampening member define a first dampening interface whereat the end wall slidingly engages the dampening member as the rotor member rotates relative to the cup-shaped housing member. The second dampening interface is defined between a first surface of the rotor member engaged with the second opposite side of the dampening member. The rotor member slidingly engages the dampening member at the second dampening interface as the rotor member rotates relative to the housing member. Since the dampening member is held in place only by compression between the rotor member and the first surface of the end wall, it is free to rotate within the rotary damper relative to both the rotor member and the cup-shaped housing member, thereby providing the pair of dampening interface surfaces.

In accordance with yet a more further limited aspect of the invention, the first dampening interface includes a plurality of first radially extending rib members evenly arranged on the first surface of the end wall every 60° so as to radiate from the central longitudinal axis defined by the cylindrical side wall. The second dampening interface includes a plurality of second rib members formed on the first surface of the rotor member, the plurality of second rib members being evenly disposed on the first surface of the rotor member in an orientation radiating every 60° from the central longitudinal axis. Preferably, the plurality of first and second rib members are identically formed in a mirror image.

As can be seen from the foregoing, a primary object of the invention is to provide an extremely simple damper device capable of generating counter moments between rotating parts without the need for complicated and expensive viscous fluids or spring clutches.

Yet another object of the invention is the provision of a device of the type described which can be easily snap-fitted together without the need for much precision or the use of special manufacturing equipment.

A still further object of the invention is an extremely simple device of the type described which is constituted of two relatively simple injection molded plastic components and a single dampening disk that can be formed by injection molding, cut from an extruded dampening plastic material, die cut from a sheet, or cut from a molded or extruded tubular shape.

Yet another object is the provision of an apparatus and assembly of the type described including a rotor member which can be assembled into a housing member in multiple equivalent orientations without adversely affecting the performance of the device.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, and wherein:

FIG. 5a is a side elevational view of a preferred configuration of an operatively associated rotational shaft member for engaging the rotor member as illustrated in FIG. 1;

FIGS. 5b–5f are sectional plan views of the rotational shaft member of FIG. 5a taken through lines 5b—5b, 5c—5c, 5d—5d, 5e—5e, and 5f—5f, respectively;

FIG. 6a is a sectional side elevational view of the subject rotational damper taken along line 6—6 in FIG. 1 illustrating a 48% compression of the damping member;

FIG. 6b is a sectional side elevational view of the subject rotational damper taken along line 6—6 in FIG. 1 illustrating a 54% compression of the damping member;

DETAILED DESCRIPTION OF THE PREFERRED EMBODIMENTS

Figure 1:
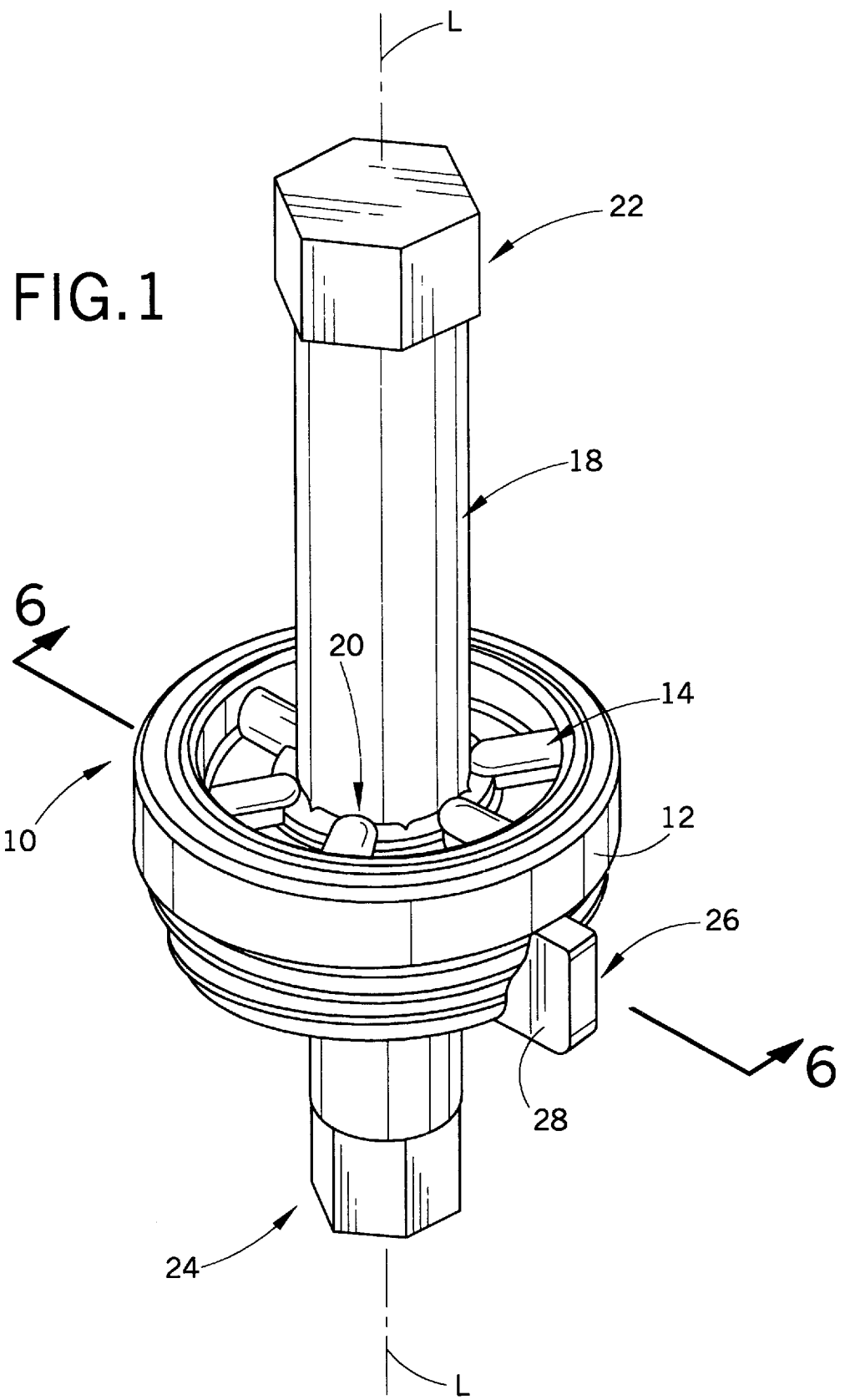
FIG. 1 is a perspective view showing an operatively associated rotational shaft member engaged with the rotational damper of the subject invention.

Referring now to the drawings wherein the showings are for the purposes of illustrating the preferred embodiments of the invention only and not for purposes of limiting same, FIGS. 1–6 illustrate a rotational damper 10 formed in accordance with a first preferred embodiment of the invention.

Broadly, the subject damper comprises a generally cylindrical cup-shaped housing member 12 adapted to receive a spoked wheel-like rotor member 14 and a disk-like damping member 16 firmly held in compression between the housing member and the rotor member substantially as shown. In its preferred form, the rotor member 14 is adapted to engage an operatively associated external elongate rotatable shaft member 18 at a first attachment area 20. The shaft member 18 extends from a first top end 22 to a second smaller bottom end 24 and therebetween along its longitudinal axis L through the subject rotational damper 10 generally as shown. A second attachment area 26 is provided on the housing member, preferably in the form of a planar key 28 as illustrated, to adapt the housing member 12 for connection to a second operatively associated external member (not shown).

In preferred practice of the subject invention, the rotational damper 10 is disposed in a relatively fixed relationship with respect to each of the first and second operatively associated external members in a manner that relative rotational movement between the housing member 12 and the rotor member 14 about the longitudinal axis L effects a dampening between the first external member connected to the rotor member 14 and the second external member connected to the housing member 12.

The housing member 12 and the rotor member 14 are preferably formed by an injection molding process from a relatively hard, somewhat rigid, acetal material. The housing and rotor members could also be formed of nylon, or one of the members could be formed of acetal material and the other of a nylon material. Any durable polymer such as, for example, plastic or nylon or polymer blend could be used as well.

In the assembled state of the subject device as shown in FIGS. 1, 6a, and 6b, the damping member 16 is held in a squeezed compression between a top face surface of the housing member 12 and a bottom face surface of the rotor member 14. Accordingly, the damping member 16 is preferably injection molded of damping material having suitable material properties, including durometer and coefficient of friction properties, to accommodate the intended application of the subject rotational damper 10.

The damping member could also be cut from a sheet of damping material or formed from a slice of an extruded or injection molded tube of damping material as well.

In its preferred form, the dampening member 16 has a durometer of about 50–60 Shore A. Also, to prevent squeaking noises in the damper, the silicone forming the dampening member is preferably blended with a phenyl fluid additive. During use of the subject damper, the phenyl fluid additive bleeds out of the dampening disc to provide a first lubricious surface between the dampening disc and the rotor and a second lubricious surface between the disc and the housing member.

Figure 2:
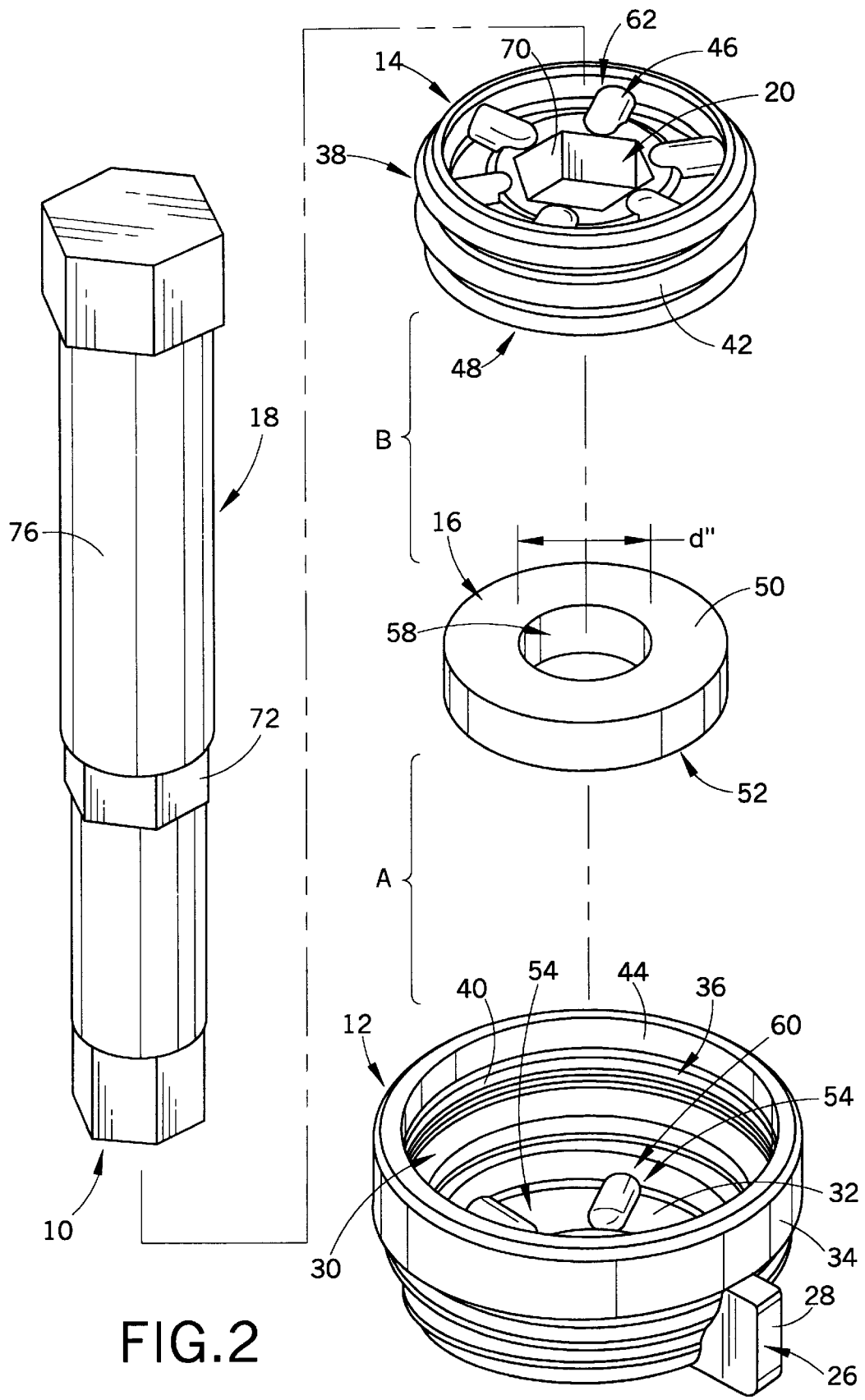
FIG. 2 is an exploded perspective view of the elements comprising the subject damper illustrated in FIG. 1 together with the shaft member.

FIG. 2 shows the preferred manner in which the rotor member 14 and the damping member 16 are received in a housing space 30 defined between a substantially planar annular end wall 32 of the housing member 12 and a cylindrical side wall 34 extending from the annular end wall 32. The damping member 16 is firmly held between the rotor member 14 and the end wall 32 in a squeezed compression-type relationship in order to best provide a counter force to dampen the relative motion between the rotor member and the housing member. To that end, the cylindrical side wall of the housing member and the rotor member respectively define cooperating first and second circular connecting areas 36, 38. The connecting areas are useful to fasten the rotor to the housing member as well as to provide a suitable bearing surface to support relative rotational movement between the rotor and the housing member. In accordance with the preferred embodiment illustrated, however, the connecting areas comprise a circular lip 40 arranged on the cylindrical side wall 34 and a cooperating circular groove 42 formed along the outer circumference of the rotor member 14. The circular lip 40 carried on the cylindrical side wall 34 extends inwardly into the housing space 30 as illustrated so that the rotor member 14 can be guided into suitable aligned position with the housing member by a cylindrical rim region 44 as the rotor member is advanced into the final snap-fit locking position between the first and second connecting areas 36, 38. Accordingly, the circular lip 40 being provided on the housing member assists in the assemblability of the subject rotational damper.

In addition to the above and also in furtherance of the assemblability of the subject device, the rotor member 14 is symmetrical with respect to a plane containing said circular groove 42. In that way, the top face surface 46 of the rotor member is identically formed to the bottom face surface 48 so that the subject rotational damper can be easily assembled regardless of the orientation of the rotor member with respect to the housing member, only that the first and second circular connecting areas 36, 38 are in substantial alignment. In a similar fashion, the damping member 16 is symmetrically formed so that the top and bottom face surfaces 50, 52 thereof provide equivalent contact engagement between a one of the top and bottom face surfaces 46, 48 of the rotor member 14 and a contact face surface 54 provided on the annular end wall 32 of the housing member 12.

As described generally above, it is an advantage of the present invention that a pair of dampening interfaces A, B are created by the various components comprising the subject rotational damper. As illustrated best in FIGS. 2, 6a, and 6b, the first dampening interface A is formed at the engagement area between the bottom face surface 52 of the damping member 16 and the contact face surface 54 of the housing member end wall 32. The second dampening interface B is formed at the engagement area between the bottom face surface 48 of the rotor member 14 and the top face surface 50 of the damping member 16. Since the damping member 16 is not held fixed to any of the elements forming the subject damper but, rather, is free to rotate within the housing space 30, the forces generated by the first and second dampening interfaces A, B are cumulative.

In order to achieve the best possible dampening effect between the rotor and housing members without compromising the vulnerability of the device to excessive wear or of stiction forming between those parts, the contact face surface 54 of the housing end wall as well as the top and bottom face surfaces 46, 48 of the rotor member include respective sets of radially extending rib members 60, 62, and 64 as shown. Although radial rib members are used, protrusions shaped in many other configurations such as annular rings, grooves, dimples, bosses, or combinations thereof could be used on the rotor member, the end wall, or both as well.

FIG. 6a illustrates a 48% compression of the damping member 16 between opposing sets of radially extending ribs 60, 64 formed on the contact face surface of the end wall and the bottom surface of the rotor member, respectively. FIG. 6b illustrates a 54% compression of the damping member 16 between opposing sets of radially extending ribs 60, 64 formed on the annular end wall and rotor member, respectively. The 48% compression of the dampening member 16 has been found to be particularly useful when used in conjunction with dampening member materials having a durometer of between 50 and 60 Shore A. Also, 54% compression of the dampening member 16 is useful with dampening materials having a durometer of between 50 and 60 Shore A as well. The 48% and 54% compressions are established when the opposing sets of radially extruding ribs 60, 64 are in alignment. When annular rings, grooves, or other continuous configurations are used, the compression of the disc member remains constant as the rotor rotates.

Figure 3A:
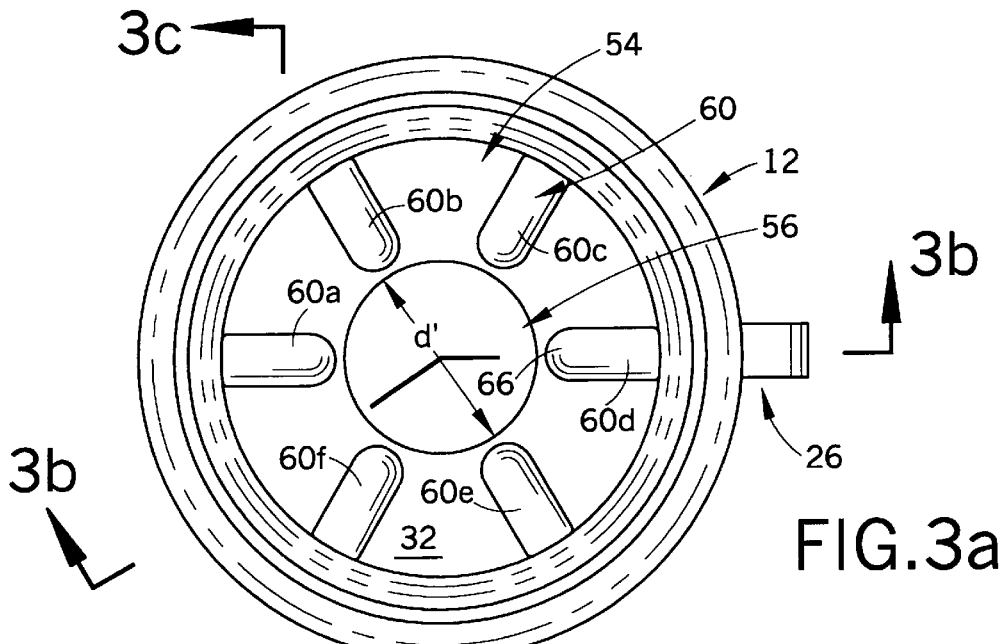
FIG. 3a is a plan view showing the housing member of the subject rotational damper illustrated in FIG. 1.
Figure 3B:
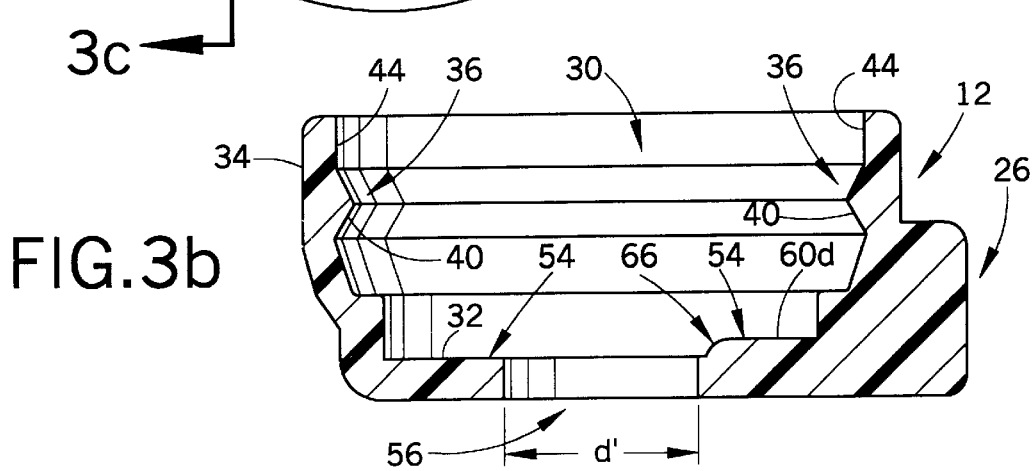
FIGS. 3b and 3c are sectional side elevational views of the housing member of FIG. 3a taken through lines 3b—3b and 3c—3c, respectively.
Figure 3C:
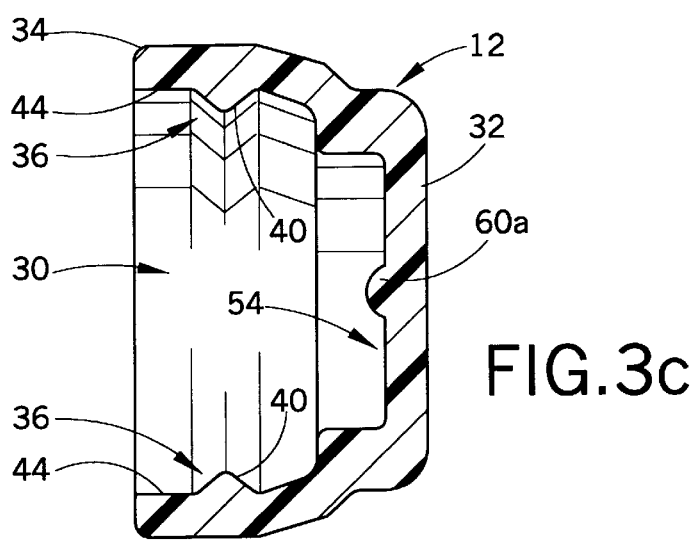

The set of radially extending ribs 60 formed on the annular end wall of the housing member are best illustrated in FIGS. 3a and 3c. Preferably, the set of ribs 60 include six (6) rib members 60a–60f arranged substantially as shown in an even, spaced apart relationship about the contact surface 54 of the annular end wall 32. FIG. 3c illustrates a first rib member 60a in cross section whereat the profile thereof is preferably semi-circular in shape so that an equivalent counter moment is created regardless of the relative direction of movement between the damping member and the housing member. FIG. 3b illustrates the radiused nose region 66 of the first rib member 60d provided to ensure that the damping member 16 is not gouged by any sharp edges or the like during use.

Figure 4A:
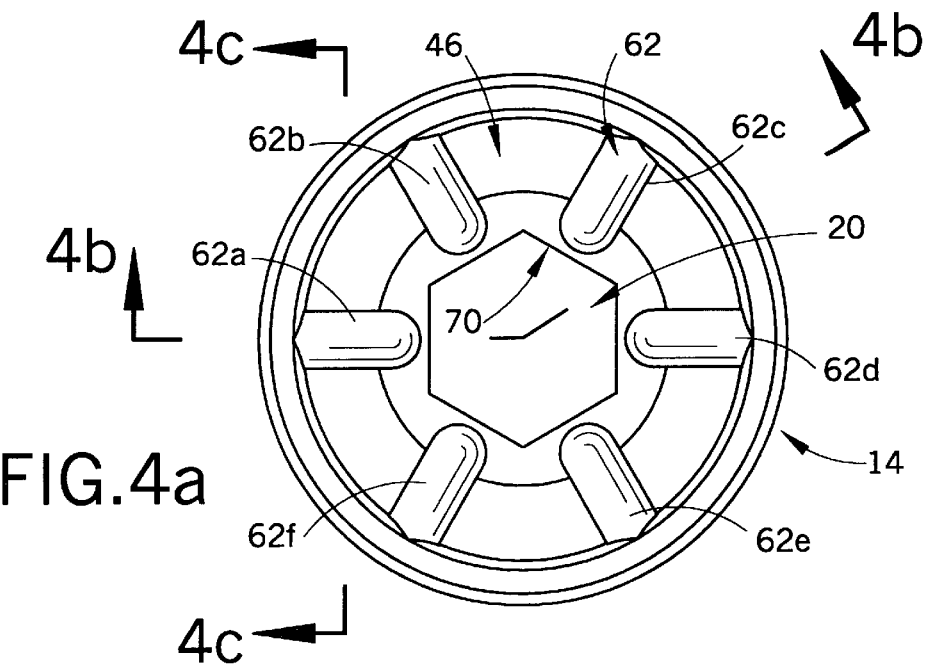
FIG. 4a is a plan view showing the rotor member of the subject rotational damper illustrated in FIG. 1.
Figure 4B:
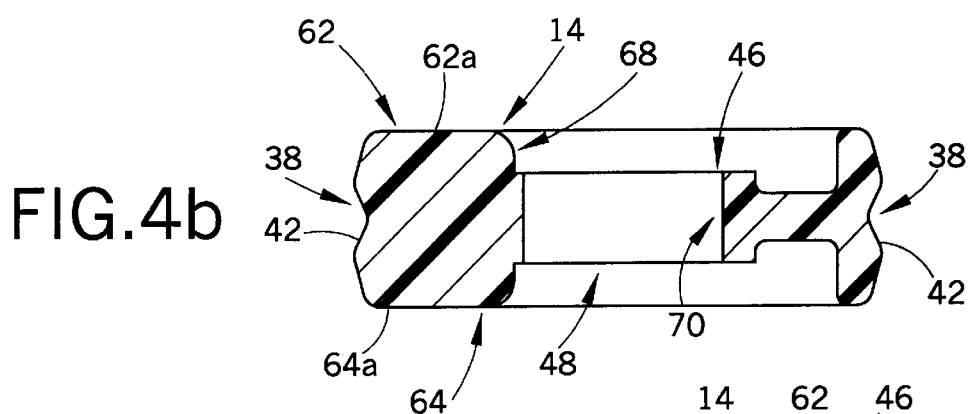
FIGS. 4b and 4c are sectional side elevational views of the rotor member of FIG. 4a taken through lines 4b—4b and 4c—4c, respectively.
Figure 4C:
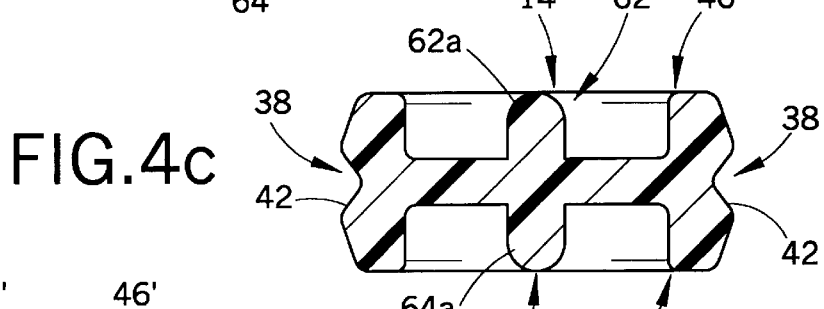

FIG. 4a illustrates the arrangement of the set of radially extending ribs 62 formed on the top of the rotor member 14. The set of radially extending ribs 64 formed on the bottom of the rotor member are substantially identically formed and arranged and, therefore, the description of the top set of rib members is equally applicable thereto. The set of rib members include six (6) rib members 62a–62f disposed evenly about the top face surface 46 of the rotor member 14. FIG. 4c illustrates the first radially extending rib member 62a in cross section whereat the first rib member has a substantially semi-circular cross section so that an equivalent counter moment is created regardless of the relative direction of rotation between the rotor member 14 and the damping member 16. FIG. 4b illustrates a radiused nose 68 formed on the first radially extending rib member 62a for the purpose of minimizing any gouging or damage to the damping member during use of the subject rotational damper.

Figure 4D:
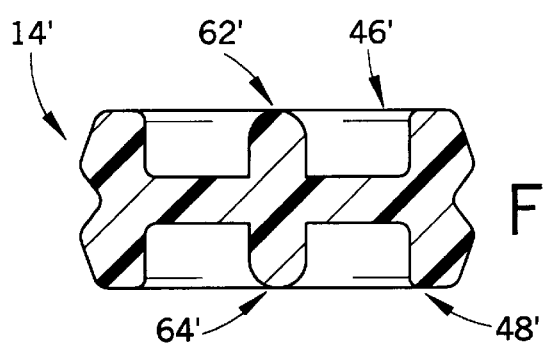
FIG. 4d is a sectional side elevational view of an alternative laterally asymmetric rotor configuration to the rotor of FIG. 4c.

The rotor member 14 of FIGS. 4a–4c are laterally symmetric so that assembly of the subject rotational damper can be performed easily and without the added burden of orienting the rotor before inserting it into the housing member. As illustrated in FIG. 4d, however, the top rib members 62' are larger than the bottom rib members 64' so that the rotor member 14' is laterally asymmetric. In that way, the compression of the dampening disc member can be selected during assembly of the damper merely by orienting the rotor relative to the housing member. As an example, the bottom face surface 48' of the rotor 14' would be used to establish the 48% compression illustrated in FIG. 6a and the top face surface 46' of the rotor would be used to establish the 54% compression illustrated in FIG. 6b. In that way, a single inventory of asymmetric rotor members could be used to assemble dampers having different characteristics selectable during assembly.

With more particular reference now to FIGS. 2 and 5a–5f, but with continued reference to FIGS. 3 and 4, the first attachment area 20 provided on the rotor member 14 is shown generally as a hexagonal aperture 70 adapted for intermateable connection with a male hexagonal connection region 72 formed midway between the top and bottom ends 22, 24 of the shaft member 18 substantially as illustrated and shown in cross section at FIG. 5d. To ensure that the shaft member 18 does not slide through the rotor member 14, an abutment area 74 is formed on the shaft member between the hexagonal connection region 72 and an enlarged cylindrical region 76 shown in cross section in FIG. 5c. At the top end 22 of the shaft member 18, a hexagonal connection area 78 is provided to facilitate the connection of the shaft member to other operatively associated movable components. The hexagonal connection area 78 is shown in cross section in FIG. 5b.

A reduced diameter cylindrical region 80 extends between the hexagonal connection region 72 and a lower hexagonal connection area 82 arranged at the bottom end 24 of the shaft member 18. The reduced cylindrical region 80 is illustrated in cross section in FIG. 5e whereat the diameter d of the reduced cylindrical region 80 is preferably slightly less than the diameter d' of a circular aperture 56 arranged at the end wall of the housing member 12 as best shown in FIG. 3a and 3b. As well, the diameter d of the reduced cylindrical region 80 is slightly less than the inner diameter d" of a circular aperture 58 formed in the damping member 16 as best illustrated in FIGS. 6a and 6b. In that manner, the shaft member 18 is free to rotate relative to the housing member 12 and the damping member 16 without contacting same.

Figure 7:
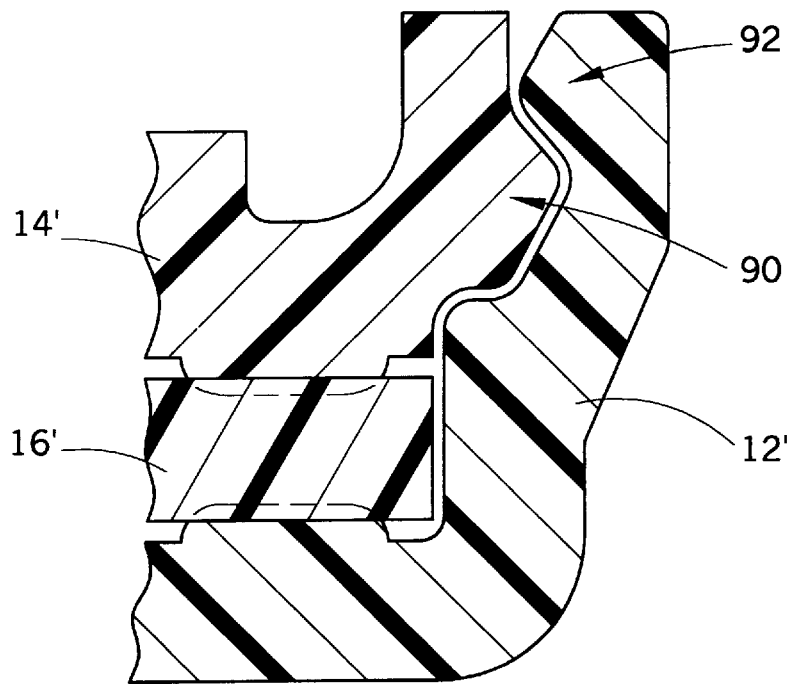
FIG. 7 is a partial sectional side elevational view of a second preferred embodiment of the subject rotational damper illustrating an alternative rotor member construction; and, FIG. 8 is a partial sectional side elevational view of a third preferred embodiment of the subject rotational damper illustrating an alternative dampening member and housing member construction.

FIG. 7 illustrates a second preferred embodiment of the subject rotational damper whereat the rotor member 14" defines an outwardly extending circular lip 90 adapted to engage a corresponding inwardly extending circular lip 92 formed on the housing member 12'. The rotor member 14" is snap-fitted into the housing member 12' by merely pushing the rotor member into the housing member to a position as illustrated. In that position, the damping member 16' is held in its preferred compressed state in a manner substantially as described above.

Figure 8:
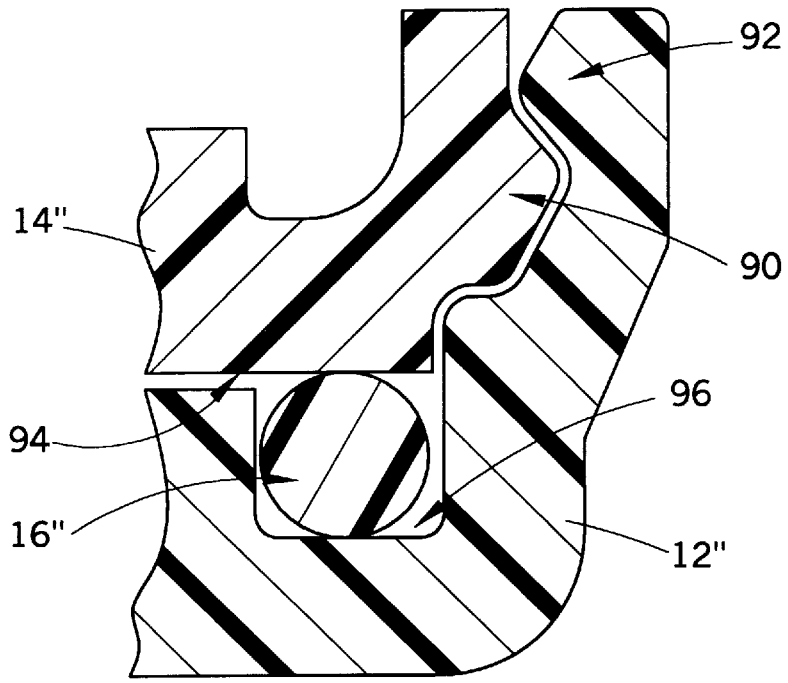

FIG. 8 illustrates a third preferred embodiment of the subject rotational damper whereat an O-ring type damping member 16" is held in a compressed state between the flat bottom surface 94 of a rotor member 14''' and an annular groove 96 formed in the housing member 12". In this embodiment, the O-ring shaped damping member engages smooth flat surfaces rather than the rounded rib members described in connection with the above first preferred embodiment.

The embodiment illustrated in FIG. 8 could be modified, however, to include a set of ribs of the type described on the underside of the rotor 14''' or within the bottom or side walls of the annular groove 96 to provide adequate damping results.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A rotational dampening apparatus comprising:
   a cup-shaped housing member having a substantially planar annular end wall defining a first surface, a cylindrical side wall extending from the first surface of the annular end wall, and a plurality of first rib members disposed on the first surface in an orientation radiating from a central longitudinal axis defined by said cylindrical side wall; and,
   mounted for rotational movement in said cup-shaped housing member:
   i) a rotor member including a plurality of second rib members formed on a first surface of the rotor member, the plurality of second rib members being disposed on said first surface of the rotor member in an orientation radiating from said central longitudinal axis defined by said cylindrical side wall; and,
   ii) a dampening member compressed between a first surface of said rotor member and said first surface of the end wall for generating frictional dampening forces between said rotor member and said housing member as the rotor member rotates relative to the housing member.

2. The rotational dampening apparatus according to claim 1 wherein the dampening member is a disc-shaped compressible member formed of silicone.

3. The rotational dampening apparatus according to claim 2 wherein:

the cylindrical side wall and the rotor member respectively define cooperating first and second circular connecting areas; and, the rotor member and the housing member are disposed in an engaged relationship at said cooperating first and second circular connecting areas.

4. The rotational dampening apparatus according to claim 3 wherein the cooperating first and second circular connecting areas form a bearing surface between said rotor member and said cylindrical side wall to hold the rotor member in said engaged relationship in said cup-shaped housing member against a biasing force of said dampening member compressed between said rotor member and said first surface of the end wall.

5. The rotational dampening apparatus according to claim 4 wherein the housing member is adapted to hold the rotor member in said engaged relationship in said cup-shaped housing member as the rotor member rotates relative to the housing member.

6. The rotational dampening apparatus according to claim 5 wherein:

the cylindrical side wall defines a central longitudinal axis;

the rotor member forms a first aperture substantially centered on said central longitudinal axis, the first aperture defining a first attachment area adapting the rotor member for connection to a first operatively associated external member movable relative to said housing member; and, the housing member defines a second attachment area adapting the housing member for connection to a second operatively associated external member movable relative to said rotor member.

7. The rotational dampening apparatus according to claim 6 wherein:

the annular end wall forms a second aperture substantially centered on said central longitudinal axis, the second aperture adapting the cup-shaped housing member to loosely receive said first operatively associated external member therethrough along said central longitudinal axis; and, the disk-shaped compressible member forms a third aperture substantially centered on said central longitudinal axis, the third aperture adapting the disc-shaped compressible member to loosely receive said first operatively associated external member therethrough along said central longitudinal axis.

8. The rotational dampening apparatus according to claim 5 wherein:

said first surface of the annular end wall defines a first dampening interface for adapting the end wall to slidingly engage said dampening member as the rotor member rotates relative to the housing member; and, said first surface of the rotor member defines a second dampening interface for adapting the rotor member to slidingly engage said dampening member as the rotor member rotates relative to the housing member.

9. The rotational dampening apparatus according to claim 2 wherein the dampening member is formed of silicone blended with a phenyl fluid additive to provide a lubricious interface between the dampening member, the rotor member, and the housing member.

10. The rotational dampening apparatus according to claim 1 wherein the dampening member is a disc-shaped compressible member formed of a resilient soft plastic.

11. A rotational dampening apparatus comprising:

a cup-shaped housing member having a substantially planar annular end wall forming a first surface defining a plurality of first protrusions, and a cylindrical side wall extending from the first surface of the annular end wall and defining a central longitudinal axis;

a rotor member including a plurality of second protrusions formed on a first surface of the rotor member, the plurality of second protrusions being disposed on said first surface of the rotor member in an orientation extending towards said first surface of the housing member; and, a dampening member disposed between said first surface of said rotor member and said first surface of the end wall for generating frictional dampening forces between said rotor member and said housing member as the rotor member moves relative to the housing member.

12. The rotational dampening apparatus according to claim 11 wherein the dampening member is free to rotate relative to said housing member and relative to said rotor member.

13. The rotational dampening apparatus according to claim 12 wherein the dampening member is a disc-shaped compressible member formed of a one of silicone and a resilient soft plastic.

14. The rotational dampening apparatus according to claim 13 wherein the dampening member is formed of silicone blended with a phenyl fluid additive to provide a lubricious interface between the dampening member, the rotor member, and the housing member.

15. The rotational dampening apparatus according to claim 11 wherein:

the rotor member forms a first aperture substantially centered on said central longitudinal axis, the first aperture defining a first attachment area adapting the rotor member for connection to a first operatively associated external member movable relative to said housing member; and, the housing member defines a second attachment area adapting the housing member for connection to a second operatively associated external member movable relative to said rotor member.

16. The rotational dampening apparatus according to claim 15 wherein:

the annular end wall forms a second aperture substantially centered on said central longitudinal axis, the second aperture adapting the cup-shaped housing member to loosely receive said first operatively associated external member therethrough along said central longitudinal axis; and, the dampening member forms a third aperture substantially centered on said central longitudinal axis, the third aperture adapting the dampening member to loosely receive said first operatively associated external member therethrough along said central longitudinal axis.

17. The rotational dampening apparatus according to claim 11 wherein:

the cylindrical side wall and the rotor member respectively define cooperating first and second connecting areas; and, the rotor member and the housing member are disposed in an engaged relationship at said cooperating first and second connecting areas.

18. The rotational dampening apparatus according to claim 17 wherein:

the cooperating first and second connecting areas form a bearing surface between said rotor member and said cylindrical side wall to hold the rotor member in said engaged relationship in said cup-shaped housing member against a biasing force of said dampening member compressed between said rotor member and said first surface of the end wall; and, the housing member is adapted to hold the rotor member in said engaged relationship in said cup-shaped housing member as the rotor member is moved relative to the housing member.

19. A rotational dampening apparatus comprising:

a housing member having a substantially planar end wall forming a first surface defining a plurality of first protrusions, and a cylindrical side wall extending from the first surface of the end wall and defining a central longitudinal axis;

a rotor member including a plurality of second protrusions formed on a first surface of the rotor member; and, a dampening member mounted for free movement relative to the housing member and disposed between said plurality of first and second protrusions for generating frictional dampening forces between said rotor member and said housing member as the rotor member moves relative to the housing member.

20. The rotational dampening apparatus according to claim 19 wherein:

said plurality of first protrusions on said housing member extend radially relative to said central longitudinal axis; and, said plurality of second projections on said rotor member extend radially relative to said central longitudinal axis.

* * * * *